Oct. 14, 1952  R. ANXIONNAZ ET AL  2,613,869
AXIAL FLOW COMPRESSOR
Filed Oct. 14, 1947  2 SHEETS—SHEET 1

INVENTOR
Rene Anxionnaz
+ Roger J. Imbert
By Watson, Cole, Grindle + Watson

UNITED STATES PATENT OFFICE 2,613,869

AXIAL FLOW COMPRESSOR

René Anxionnaz and Roger J. Imbert, Paris, France, assignors, by direct and mesne assignments, to Societe Rateau (Societe Anonyme), Paris, France, a company of France Application October 14, 1947, Serial No. 779,780
In France November 8, 1946

3 Claims. (Cl. 230—120)

It is a well known fact that the relative velocity of an airscrew blade with reference to air is always higher than the speed of the progression of the aircraft, said relative velocity $w$ being equal to $\sqrt{V_0^2 + u^2}$, $V_0$ being the speed of progression of the aircraft and $u$ the peripheric velocity of the airscrew.

Consequently the peripheral velocity of the airscrew with reference to air reaches the velocity of sound before the aircraft has reached such a speed.

It is also known that in order to remove this drawback it is possible to slow down the velocity of air inside a diffusor located before the airscrew in the case of an airscrew arranged inside a tunnel-shaped casing or before the first movable blades of the air compressor in the case of a jet engine, which, as known, is also generally arranged in a tunnel-like casing extending in the fore-and-aft direction of the propelled aircraft and provided with a front aperture for the incoming air and with a rearwardly expansion nozzle.

Arrangements of this kind have been described in our prior U. S. Patent No. 2,396,911.

This slowing down of the velocity of the air shows however the drawback of leading to a loss of energy. Other losses of energy are moreover produced by the slowing down which occurs in the airstream righting blades following the airscrew or compressor wheel and also during the passage of the air through the airscrew or compressor wheel itself.

Our invention has for its object improvements applicable to single or multiple airscrews arranged in a tunnel casing and to jet engines provided with axial flow compressors for high speed aircrafts. Said improvements allow avoiding or at least considerably reducing said losses while ensuring relative velocities of air that are lower than sound velocity.

The improvements disclosed produce their maximum efficiency when associated although they may also be applied separately.

The following description together with accompanying drawings given by way of example and by no means in a limiting sense, will allow understanding how the invention may be performed.

In our U. S. Patent No. 2,396,911 there is provided a slowing down of the velocity of air at its input into the propeller through its passage inside a diffusor of increasing cross-section.

Figure 1A:
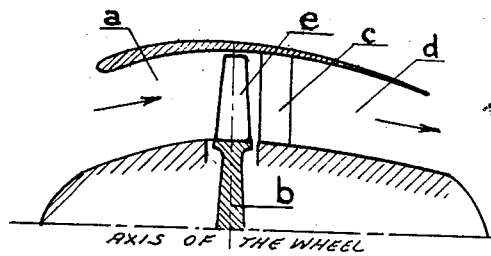
Figs. 1a, 1b, 1c, 1d show respectively an axial semi-section of a compressor wheel arranged in a tunnel-like casing, the angular setting of the blades, the triangular diagram of the velocities and the variation of the velocities along the tunnel-like casing as obtained according to our above-mentioned patent.
Figure 1B:
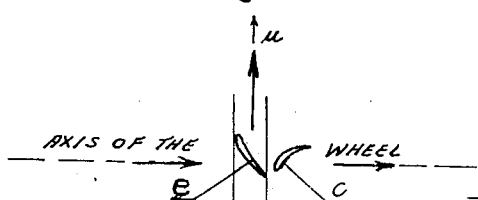

Fig. 1a shows the diffusor $a$ arranged upstream of the wheel $b$ of the compressor located in the intermediate portion of the tunnel-like casing the stationary righting blades $c$ being positioned downstream from the wheel and the rearwardly opening exhaust nozzle $d$ having a decreasing cross-section and in which the air expands while its velocity increases. The arrangement of the movable blades $e$ of the wheel and of the stationary righting blades $c$ is illustrated in Fig. 1b.

Figure 1C:
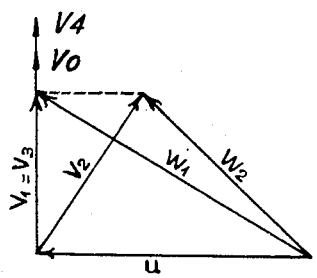

Fig. 1c shows the velocity triangle corresponding to a diameter of the wheel for which the peripheral velocity of said wheel is equal to $u.V_0$ is the absolute velocity of the air at its input into the diffusor $a$ (that is the speed of the aircraft), while $V_1$ designates the absolute velocity of the air at the input in the channels between the blades $e$ of the wheel $b$, $V_2$ is the absolute velocity of the air at the output of said blades, $V_3$ the absolute velocity of the air at the output of the righting blades $c$ and $V_4$ the absolute velocity of the air at the output from the tunnel. Lastly $W_1$ and $W_2$ are the relative velocities of the air with reference to the wheel at the input and output respectively of the wheel. The part played by the diffusor is to make the velocity $V_1$ smaller than $V_0$ so that $W_1$ may be less than the velocity of sound.

Figure 1D:
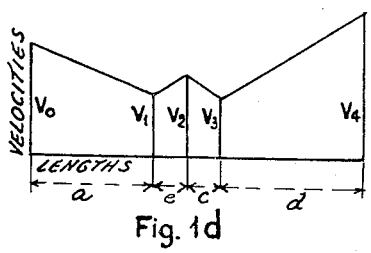

The velocity diagram of Fig. 1c corresponding to the passage of air along the length of the tunnel-like casing is therefore illustrated in Fig. 1d at a scale different from that of Fig. 1c. It is clearly apparent from said diagram that the velocity is reduced in the diffusor $a$ between $V_0$ and $V_1$ and in the righting blades $c$ between $V_2$ and $V_3$, which corresponds to losses of energy.

Figure 2A:
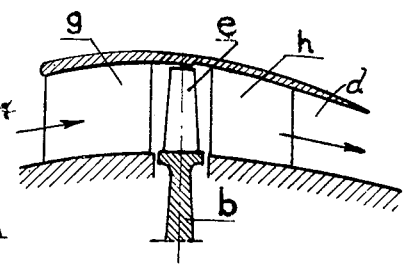
Figs. 2a, 2b, 2c and 2d are similar views and diagrams illustrating the two first improvements according to our present invention.
Figure 2B:
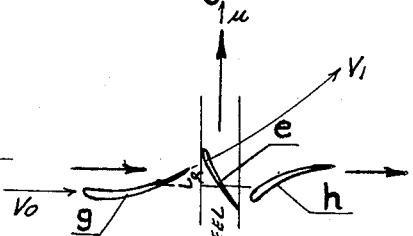

When the first of the features forming the object of the present invention is applied in practice, the velocity of air is not lowered substantially before it reaches the wheel, and the parts are arranged as illustrated in Figs. 2a and 2b. The inlet part of the tunnel-like casing arranged before the wheel has no longer an increasing cross-section, but is of substantially uniform cross-section so as to keep $V_0$ substantially equal to $V_1$ (Figures 2d and 3d) and this inlet part of the casing also includes stationary blades $g$ the entrance edges of which are substantially parallel to the direction of the velocity $V_0$ of the incoming air, while their trailing edge is inclined in the direction of rotation of the wheel, so that said blades $g$ may incline the direction of $V_1$ by a certain angle $a$ with reference to $V_0$.

The application of the second feature according to our invention, to wit: the cancellation of the slowing down of the velocity of the air between the air stream righting blades beyond the airscrew or compressor wheel leads to the provision between the said blades $h$ of channels having a cross-section which decreases in the direction of flow of air. The blades $h$ have a shape that is more elongated than that of blades $c$ in the case of Figs. 1a and 1b, and as the annular air passage provided in the tunnel-like casing has a cross-sectional area which decreases from the wheel in the direction of the airflow, the elongated channels between the blades $h$ and the casing have also a cross-sectional area which decreases appreciably, so that the absolute velocity $V_3$ at the exit of the air from mid-channels is now greater than the absolute velocity $V_2$ at the exit from the wheel.

Figure 2C:
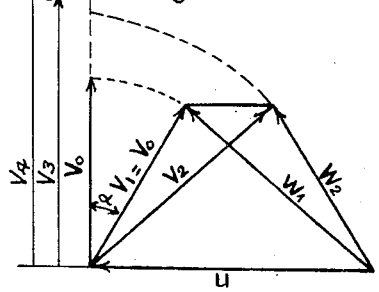

In the velocity triangle of Fig. 2c it is apparent that by giving to the angle $a$ a suitable value which depends on the speed of the flight $V_0$ and on the velocity $u$ of the wheel, it is always possible in practice and without any reduction of the velocity $V_0$ of the incoming air, whatever may be its value, to obtain a relative speed $W_1$ that corresponds to a satisfactory Mach number, Mach numbers being as well known the quotients of the velocity considered by the local velocity of sound.

In the triangle considered, the velocities $V_0$ and $V_1$ are equal or substantially equal.

Figure 2D:
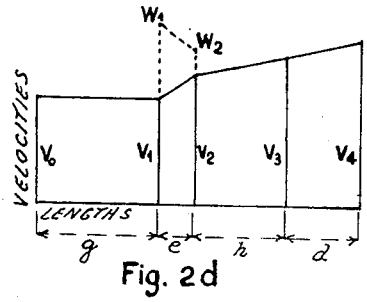

The diagrams of velocities shown in Figs. 2c and 2d show the result of the simultaneous application of the two above improvements. As concerns the first improvement, it is apparent that $V_1 = V_0$, and as concerns the second it will be noticed that $V_2$, $V_3$, $V_4$ increase in the sequence considered, whereby the losses of energy through slowing down of the gaseous flow are done away with.

Figure 3A:
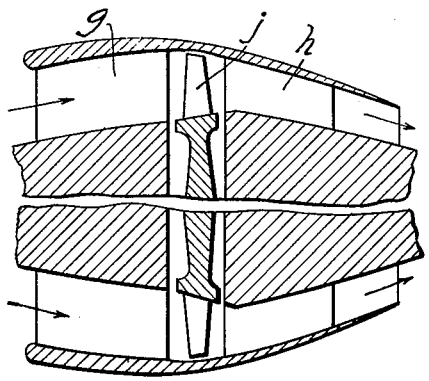
Figs. 3a, 3b, 3c and 3d are views and diagrams with the incorporation in addition to said two first improvements of the third improvement according to our invention, Figure 3a showing in section the tunnel-like casing within which the compressor means is situated.
Figure 3B:
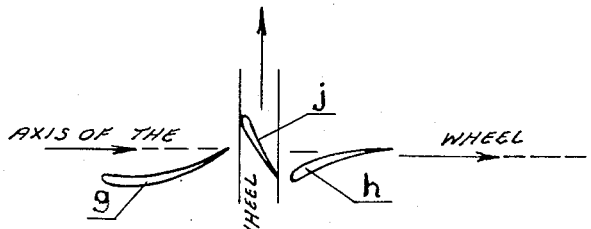

Now, if there is applied furthermore the third feature according to our invention, i. e. the removal of any slowing down of the relative velocity inside the wheel or at least a substantial reduction of this slowing down, we obtain the arrangement illustrated in Fig. 3a. Said figure shows the particular modification of the wheel $j$: the input cross-section of the air channels located between the successive blades has a larger area than the output cross-section whereby the absolute velocity $V_2$ of air at the output of the wheel is increased and consequently the velocity $W_2$ of air relatively to the wheel at the output of the wheel main remain equal to the relative velocity $W_1$ at the input in the wheel.

Fig. 3a shows that the decreasing cross-section of said channels may be obtained by a conical form given to the rim of the wheel.

Figure 3C:
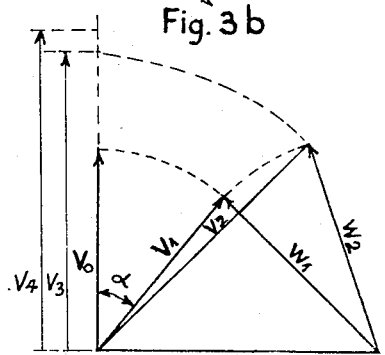

The triangle of velocities is that illustrated in Fig. 3c. It will be noticed that the relative velocities $W_1$ and $W_2$ are equal or substantially equal.

Figure 3D:
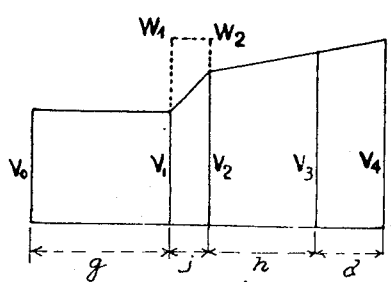

The diagrams of the air velocities along the tunnel-like casing is in this case that illustrated in Fig. 3d at a scale that is different from that of Fig. 3c. Obviously, in the preceding disclosure, equality between the velocities $V_0$ and $V_1$ and between the relative velocities $W_1$ and $W_2$ have been considered as for the mean diameter, that is the most efficient, on the blades of the airscrew or compressor wheel, the cross-sections of the blades and outline shapes thereof for the diameters above and below said mean diameter will be chosen as best as possible by the man skilled in the art in accordance with aerodynamic laws.

The first feature of our invention described hereinabove may be applied at the input into the first compressor wheel of a jet engine or into the first row of blades of a multi-cellular airscrew arranged inside a tunnel casing. The second feature is applicable to the last wheel of row of blades of said systems and the third to all the wheels or rows of blades.

What we claim is:

1. In a propelling device for high speed aircraft, a tunnel-like casing extending in the fore-and-aft direction of said aircraft and comprising an upstream air collecting portion, an intermediate air compressing portion, and a downstream nozzle portion opening rearwardly, the said air collecting portion having its upstream end open to the atmosphere and being of substantially uniform cross-section, whereby the velocity of the incoming air is kept substantially constant therethrough, a bladed rotor the blades of which are adapted to move transversely in said air compressing portion and stationary blades in said air collecting portion, said stationary blades having entrance portions parallel to the velocity of the incoming air and trailing portions which are inclined in the direction of rotation of said rotor by an angle adapted to the rotor velocity so that the inclined but substantially unchanged absolute velocity of air where it leaves said trailing portions to enter the rotor, compounded with the rotor velocity gives an air velocity relatively to the rotor which is lower than sound velocity.

2. The combination of claim 1 wherein further the nozzle portion comprises adjacent to said rotor a set of stationary blades adapted for righting the direction of the air flow issuing from said rotor, said blades delimiting with the casing air channels the cross-sectional area of which decreases in the direction of the air flow in a proportion adapted to increase the absolute velocity of the air issuing from the rotor.

3. In a propelling device for high speed aircraft, a tunnel-like casing extending in the fore-and-aft direction of said aircraft and comprising an upstream air collecting portion, an intermediate air compressing portion, and a downstream nozzle portion opening rearwardly, the said air collecting portion having its upstream end open to the atmosphere and being of substantially uniform cross-section, whereby the velocity of the incoming air is kept substantially constant therethrough, a rotor having a rim and blades secured to said rim and adapted to move transversely in said air compressing portion, said blades and said rim delimiting therebetween air channels which have a cross-sectional area decreasing in the direction of flow of the air, the decrease in area being adapted to produce at the outlet from said rotor a relative velocity of the air at least equa to the relative velocity at the inlet in said rotor, and stationary blades in said air collecting portion, said stationary blades having a curvature adapted to incline the direction of the absolute velocity of the incoming air in the direction of rotation of said rotor in a degree adapted to the rotor velocity so that the absolute velocity of air where it enters the rotor, compounded with the rotor velocity gives an air velocity relatively to the rotor which is lower than sound velocity.

RENÉ ANXIONNAZ.
ROGER J. IMBERT.

REFERENCES CITED

The following references are of record in the file of this patent:

UNITED STATES PATENTS

| Number | Name | Date |
|---|---|---|
| 853,363 | Holzwarth | May 14, 1907 |
| 2,320,733 | McIntyre | June 1, 1943 |
| 2,397,998 | Goddard | Apr. 9, 1946 |
| 2,406,126 | Zweifel | Aug. 20, 1946 |